United States Patent [19]

Anley

[11] 4,066,266
[45] Jan. 3, 1978

[54] ATTITUDE CONTROL DEVICE

[76] Inventor: Frank C. Anley, 914 Valour Road, Winnipeg, Canada

[21] Appl. No.: 760,834

[22] Filed: Jan. 21, 1977

[51] Int. Cl.² ............................................. G11B 3/10
[52] U.S. Cl. ................................................. 274/23 R
[58] Field of Search ..................................... 274/23 R

[56] References Cited

U.S. PATENT DOCUMENTS

| | | | |
|---|---|---|---|
| 2,455,529 | 12/1948 | Shortt | 274/23 R |
| 2,983,517 | 5/1961 | Klein | 274/23 R |
| 3,963,246 | 6/1976 | Troclimowski | 274/23 R |

Primary Examiner—Charles E. Phillips
Attorney, Agent, or Firm—Stanley G. Ade

[57] ABSTRACT

A main system is provided with one or more subordinate systems pivotally connected thereto. The subordinate system can be programmed as desired to move in reference to the main system by the provision of a magnetic attraction acting upon the subordinate system to control the relative movement thereof against a resistance to movement such as may be provided by a hair spring reacting between the systems. One embodiment includes a tone arm of a record player (the main system) having a stylus assembly mounted in a carrier (the subordinate system) with the carrier being pivotally connected to the end of the tone arm for horizontal movement relative thereto and having a hair spring operatively connected between the systems acting as a resistance to movement of the carrier relative to the tone arm. An extension or support extending from the carrier carries a magnet upon the distal end thereof which reacts with a spaced and stationary ferro-magnetic shoe so that as the stylus tracks across the associated record, the interaction of the magnet with the shoe positions or programs the carrier and hence the stylus whereby the stylus tracks all grooves tangentially.

17 Claims, 5 Drawing Figures

ATTITUDE CONTROL DEVICE

BACKGROUND OF THE INVENTION

This invention relates to new and useful improvements in attitude control devices and although the illustrated embodiment and description refers to a record player tone arm and stylus assembly, nevertheless this is by way of being an example only.

It is difficult to provide relatively simple mechanisms for controlling the movement of a subordinate system which is operatively connected to a main system and although this may be accomplished by relatively involved mechanism, nevertheless such mechanism is not only expensive to produce, but difficult to maintain.

SUMMARY OF THE INVENTION

The present invention provides means by which the attitude of a subordinate system may be programmed as desired with reference to the program of a main system. It is possible to visualize an organization of systems which may be more or less interdependent, and in which each enjoys one or more degrees of freedom of motion in which, if the program for one component or system be given, a complementary program from one or more subordinate systems may be set such that for any condition of program of the given component, a requisite attitude of the subordinate system will result.

One aspect of the invention allows a subordinate system to be programmed to perform, with respect to attitude, exactly as desired, when the main system is executing its program.

By way of example to illustrate the application of the invention to a conventional device in common use, the tone arm as used in conjunction with turntables for the reproduction of music and the like has been selected.

The history of the tone arm includes various mechanisms which either give no consideration at all to the attitude requirements of the playback stylus with reference to the record groove or attempt compensation involving complicated mechanisms having various shortcomings such as additional weight, high manufacturing expense, and considerable maintenance.

In any event, conventional attempts are a compromise in which an accurate relationship of the stylus to the groove is present in one or two grooves only. The error upon either side of these one or two grooves may be of several degrees.

The application of the present invention makes possible a condition of zero tangent error throughout all of the grooves on a record or disc and without compromise and in addition eliminates a condition called "skating" by providing a moment towards the turntable spindle equal to the skating force so that the stylus remains seated perfectly throughout its traverse.

With reference to the tone arm application, which is one application only, some conditions are prerequisite to the perfect functioning of the device. The needle bearings of the cartridge hanger and the arm gimbal should be relatively friction free and the attitude of the vertical and horizontal bearings should be as near vertical and horizontal as possible. The cartridge hanger assembly complete with the cartridge should be dynamically and statically balanced about the lower pivot bearing and likewise the tone arm assembly as a whole, including the cartridge assembly, must be dynamically and statically balanced.

As will become apparent, the cable must be of exceedingly light weight and should be connected to the assembly in such a manner as to give minimum, predictable, and repeatable interference with the operation of the arm and the subordinate assembly.

One aspect of the invention is therefore to provide an attitude control device on a supporting surface comprising in combination a main system and at least one subordinate system operatively connected thereto. Both systems are free to move relative to each other within limits, and means are provided whereby the movement of said main system generates a complementary movement of the subordinate system. Said means includes a magnetic element and a ferro-magnetic programming strip element positioned to control the movement of said subordinate system. One of the elements is secured to the subordinate system and the other of the elements is spaced from the said one element upon the supporting surface.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
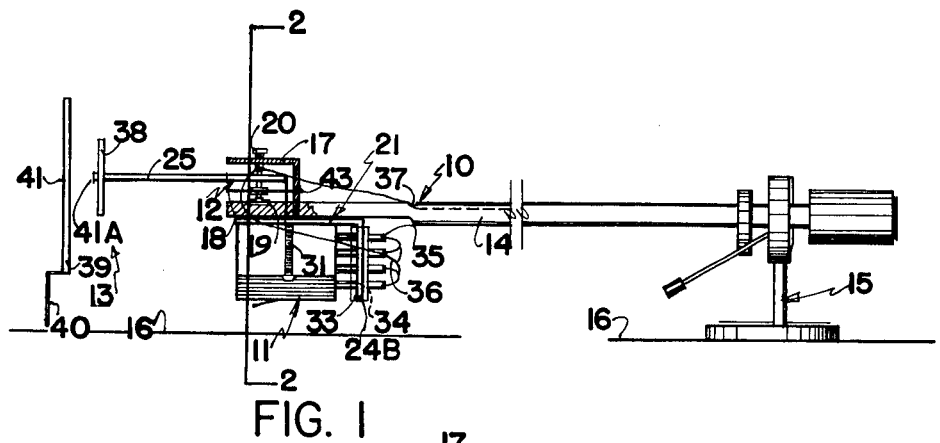
FIG. 1 is a partially sectioned side elevation of the tone arm embodiment of the invention.
Figure 2:
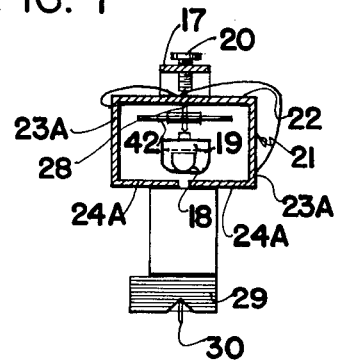
FIG. 2 is an elevational view substantially along the line 2—2 of FIG. 1.

As mentioned previously, the embodiment illustrated and described refers to a record player tone arm and stylus assembly. However, other areas of possible application might include commercial displays, guided aerial flights, model celestial movement in planetaria, visual studies of associated mathematical functions and the like.

The invention comprises a main system collectively designated 10 and at least one subordinate system collectively designated 11 pivotally connected to the main system by pivot assembly 12 and having means generally designated 13 whereby the movement of the main system generates a complementary and programmed movement of the subordinate system.

In detail, and referring to the embodiment illustrated, the main system 10 takes the form of a record player tone arm 14 supported by a conventional gimbal assembly 15 at one end thereof, upon a supporting surface 16 so that it may move in a horizontal plane responsive to the engagement of the stylus with the record grooves.

The distal end of the tone arm is provided with upper and lower vertically situated jaws 17 and 18 respectively in spaced and parallel relationship as illustrated and a lower jewel bearing assembly 19 is secured to the lower jaw 18 with a corresponding adjustable jewel bearing assembly 20 being situated vertically above the assembly 19 and in the upper jaw 17.

Figure 4:
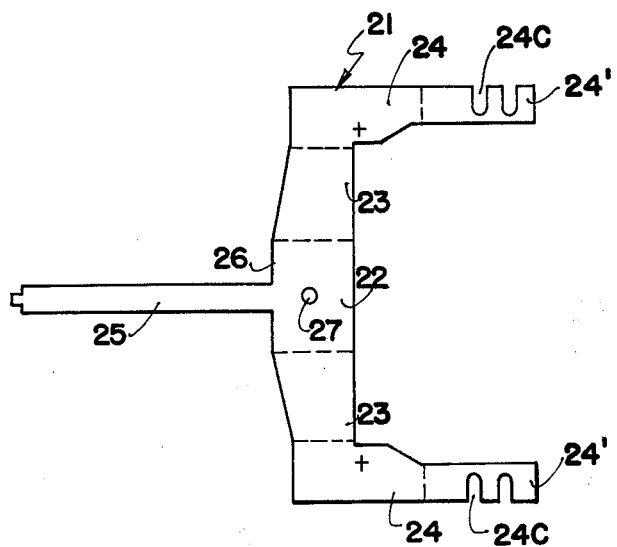
FIG. 4 is a plan view of one form of the blank from which the carrier is produced.

The secondary system 12 includes a cage collectively designated 21 preferably formed from a thin metal sheet blank illustrated in FIG. 4.

This metal blank should be formed from a non-magnetic material and of course may be moulded from plastic if desired.

The blank includes a central upper surface portion 22, side portions 23 which are angulated downwardly to form the vertical sides 23A and outer side portions 24 which are then angulated inwardly to form the inturned portions 24A, which are situated in substantially spaced and parallel relationship to the upper portion 22, when the cage is formed. the distal ends 24' of the outer side portions 24 are then turned downwardly to form contact support portion 24B as will hereinafter be described.

A forwardly extending extension 25 extends from centrally of the front edge 26 of the upper portion 22, the purpose of which will hereinafter be described.

Reference character 27 shows a small aperture in the upper portion 22 adapted to receive a pivot bear-spindle 28 fixedly secured therein by means of a press fit engagement, for example. This spindle is pivotally supported within upper and lower jewel bearings 20 and 19, or the equivalent, thus mounting the cage for pivotal movement in a horizontal plane relative to the tone arm 14.

A cartridge 29 supporting a conventional stylus 30 at its lower end, is secured to the inturned portions 24A by means of attachment screws 31. The vertical axis of this stylus 30 is in axial alignment with the vertical axis of the pivot pin 28 as clearly illustrated.

The cage together with the cartridge, forms the stylus assembly and in this regard, reference should be made to the portions 32 which consist of two non-conductive plates 33 formed from plastic or the like. These are cemented (not illustrated) to the downturned end portions 24B and apertures 34 are drilled therethrough to allow the introduction of spring contact clips 35 for the terminals of the cartridge. These engage also through notches 24C in the edges of the portions 24B. These contact clips are conventional and therefore it is not believed necessary to describe same further. A relatively thin flexible multi stranded cable 36, having at least four strands or conductors, extends from the pins upwardly and through the jaws 17 and 18 of the tone arm and then rearwardly and into the tone arm through an aperture or drilling 37 formed in the tone arm just rearwardly of the jaws.

This wire or cable is conventional and comprises four strands of individually insulated and cotton wrapped cable and is positioned as illustrated and described. Therefore, the cable is never interfered with by cartridge or stylus changes, a point that is important to uniformity of performance.

The aforementioned means 13 comprises, in this embodiment, a suitable magnet 38 secured to the distal end of the extension 25 and this magnet may take the form of a length of strong magnetic tape or strap of relatively light weight. The magnet is preferably mounted to the end of the extension through the vertical and horizontal centers of the magnet.

Figure 3:
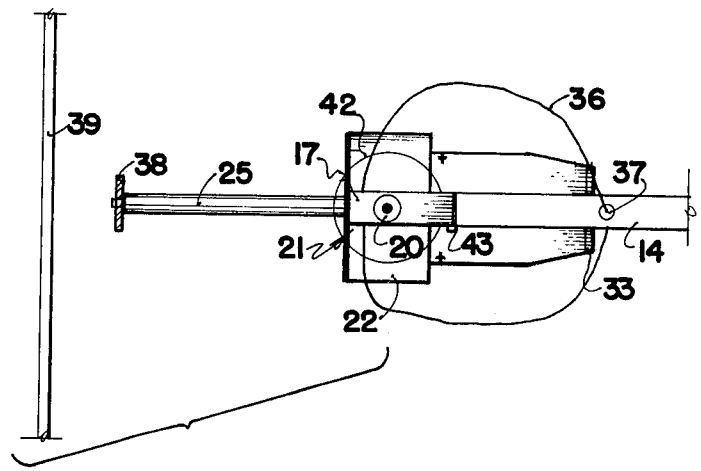
FIG. 3 is a top plan view of FIG. 1.

A ferro-magnetic programming strip element 39 is accurately curved along its length according to the program and is rigidly mounted a suitable distance above the turntable base or supporting surface by any suitable means such as, for example, brackets 40 and is spaced from the magnetic element 38 as clearly shown in FIGS. 1 and 3.

It will be noted that the vertical center point 41 of the ferro-magnetic element 39 is in horizontal alignment with the vertical center point 41A of the magnetic element 38, when the cartridge stylus is in the position to play.

Reaction means in the form of a hair spring 42 is provided and this hair spring is fixed by one end thereof to the tone arm jaw at location 43 (see FIG. 1) and by the other end to the spindle 28 in a position such that the tension provided by the hair spring keeps the assembly at an offset rest position when the arm is held by its out of play holder (not illustrated) to one side of the turntable.

As the arm is moved into position to play, the proximity of the ferro-magnetic strip or element 39 to the magnetic pad element 38, causes the extension 25 to swing the stylus assembly away from the rest position against the action of the hair spring until the force of attraction just equals the tension of the spring.

Figure 5:
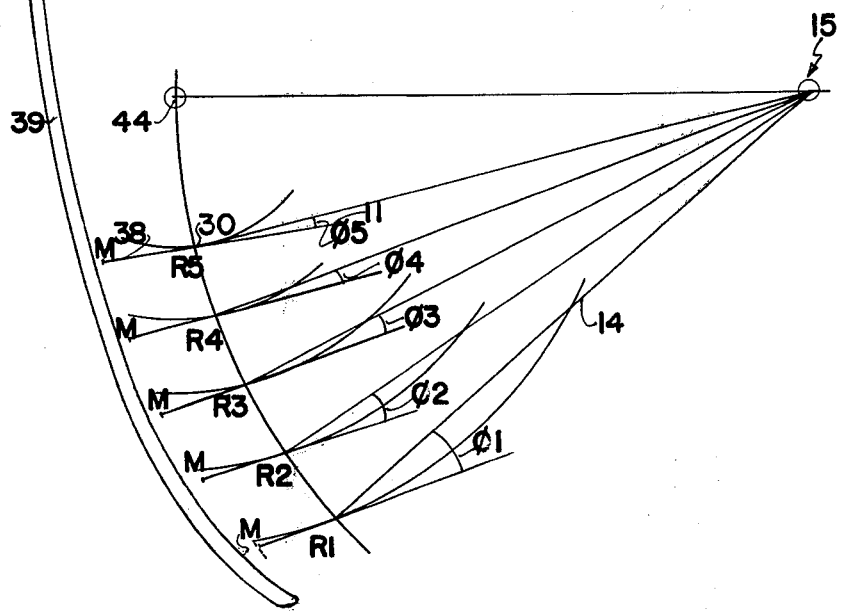
FIG. 5 is a schematic view showing the attitude of the main and subordinate components as applied to a record player.

As the arm proceeds in its swing (see FIG. 5) from position R1 through to R5, towards the spindle 44, the programmed distance M between the elements 38 and 41 decreases thus causing the stylus assembly to be swung further from its initial position and increasing the tension in the hair spring thereby remaining continually in equilibrium with the increasing magnetic attraction according perfectly with the program.

Angles $\phi 1$ to $\phi 5$ (the angle between the longitudinal axes of the arm and of the cartridge) becomes progressively smaller as the arm moves towards the spindle, finally disappearing at the spindle. When the final groove has been tracked, or at any other time, the arm may be lifted and returned to the rest position (not illustrated) or placed at any point on the record for further play.

The programming therefore makes possible, the control of attitude of the subordinate system (the stylus assembly) as the program of the main system (the tone arm) is executed and maintains, in this particular embodiment, a perfect tangential relationship between the stylus and the record grooves.

The hair spring 42 of suitable torsional strength is mounted to resist counter-clockwise motion at the center of gravity of the complete carrier or cartridge assembly and as close as possible to the lower pivot pin bearing 19.

It will be appreciated that if it should be necessary to change the playing weight of the assembly, it will be necessary also to adjust the magnetic moment towards the spindle since the skating force changes with the stylus force. This adjustment could be effected by a change involving the length of the extension 25.

A light weight but rigid hood or cover (not illustrated) may be fitted to the end of the tone arm to further guard against inadvertent disturbance of the cable or wire 36. This, however, would result in excess weight in the arm.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An attitude control device a supporting surface means mounting said device on said supporting surface comprising in combination a main system and at least one subordinate system pivotally connected to said main system, said main and subordinate systems being free to move relative to each other and within limits, and means whereby the movement of said main system generates a complementary pre-determined movement of the subordinate system, said means including a magnetic element and a ferro magnetic programming strip element positioned to control the movement of said subordinate system, said magnetic element being secured to said subordinate system and the said ferro magnetic programming strip element being spaced from said one element and secured upon said supporting surface.

2. The device according to claim 1 which includes a reaction component operatively connected between said main and subordinate systems normally urging said subordinate system in one direction against the magnetic attraction of said one element and the other element thereby maintaining equilibrium between said systems.

3. The device according to claim 2 in which said subordinate system is pivotally secured to said main system for movement of both of said systems in a horizontal plane.

4. The device according to claim 3 in which said main system includes an arm pivoted by one end thereof to the supporting surface and movable in an arc in a horizontal plane, an extension formed on said subordinate system and extending therefrom, said one element being secured to said extension.

5. The device according to claim 4 in which said arm takes the form of a record player turntable tone arm, said subordinate system including a stylus assembly on the other end of said tone arm, a record engaging stylus in said stylus assembly, a vertically situated pivot assembly mounting said stylus assembly upon said other end of said tone arm, the axis of said vertical pivot assembly being vertically above said stylus and in axial alignment therewith.

6. The device according to claim 5 in which said tone arm includes a pair of vertically situated jaws on said other end thereof, said stylus assembly including a cage, said pivot assembly mounting said cage for pivotal movement in a horizontal plane within said jaws, said stylus being mounted upon the underside of said cage, said extension being secured to and extending forwardly from said cage, said magnetic element being mounted upon the distal end of said extension, said ferro magnetic element being curved as to program and being mounted spaced from said magnetic element.

7. The device according to claim 2 in which said main system includes an arm pivoted by one end thereof to the supporting surface and movable in an arc in a horizontal plane, an extension formed on said subordinate system and extending therefrom, said one element being secured to said extension.

8. The device according to claim 7 in which said arm takes the form of a record player turntable tone arm, said subordinate system including a stylus assembly on the other end of said tone arm, a record engaging stylus in said stylus assembly, a vertically situated pivot assembly mounting said stylus assembly upon said other end of said tone arm, the axis of said vertical pivot assembly being vertically above said stylus and in axial alignment therewith.

9. The device according to claim 8 in which said tone arm includes a pair of vertically situated jaws on said other end thereof, said stylus assembly including a cage, said pivot assembly mounting said cage for pivotal movement in a horizontal plane within said jaws, said stylus being mounted upon the underside of said cage, said extension being secured to and extending forwardly from said cage, said magnetic element being mounted upon the distal end of said extension, said ferro magnetic element being curved as to program and being mounted spaced from said magnetic element.

10. The device according to claim 9 in which said reaction component takes the form of a hair spring operatively connected between said cage and said tone arm.

11. The device according to claim 1 in which said subordinate system is pivotally secured to said main system for movement of both of said systems in a horizontal plane.

12. The device according to claim 11 in which said main system includes an arm pivoted by one end thereof to the supporting surface and movable in an arc in a horizontal plane, an extension formed on said subordinate system and extending therefrom, said one element being secured to said extension.

13. The device according to claim 12 in which said arm takes the form of a record player turntable tone arm, said subordinate system including a stylus assembly on the other end of said tone arm, a record engaging stylus in said stylus assembly, a vertically situated pivot assembly mounting said stylus assembly upon said other end of said tone arm, the axis of said vertical pivot assembly being vertically above said stylus and in axial alignment therewith.

14. The device according to claim 13 in which said tone arm includes a pair of vertically situated jaws on said other end thereof, said stylus assembly including a cage, said pivot assembly mounting said cage for pivotal movement in a horizontal plane within said jaws, said stylus being mounted upon the underside of said cage, said extension being secured to and extending forwardly from said cage, said magnetic element being mounted upon the distal end of said extension, said ferro magnetic element being curved as to program and being mounted spaced from said magnetic element.

15. The device according to claim 1 in which said main system includes an arm pivoted by one end thereof to the supporting surface and movable in an arc in a horizontal plane, an extension formed on said subordinate system and extending therefrom, said one element being secured to said extension.

16. The device according to claim 15 in which said arm takes the form of a record player turntable tone arm, said subordinate system including a stylus assembly on the other end of said tone arm, a record engaging stylus in said stylus assembly, a vertically situated pivot assembly mounting said stylus assembly upon said other end of said tone arm, the axis of said vertical pivot assembly being vertically above said stylus and in axial alignment therewith.

17. The device according to claim 16 in which said tone arm includes a pair of vertically situated jaws on said other end thereof, said stylus assembly including a cage, said pivot assembly mounting said cage for pivotal movement in a horizontal plane within said jaws, said stylus being mounted upon the underside of said cage, said extension being secured to and extending forwardly from said cage, said magnetic element being mounted upon the distal end of said extension, said ferro magnetic element being curved as to program and being mounted spaced from said magnetic element.

* * * * *